United States Patent [19]

Young et al.

[11] 4,211,427
[45] Jul. 8, 1980

[54] TRAILER HITCH

[75] Inventors: David A. Young, Plymouth; Bruce S. Kimball, Ann Arbor, both of Mich.

[73] Assignee: Hoover Universal, Inc., Saline, Mich.

[21] Appl. No.: 949,777

[22] Filed: Oct. 10, 1978

[51] Int. Cl.² ............................................. B60D 1/00
[52] U.S. Cl. ................................. 280/406 A; 403/109
[58] Field of Search .......... 280/406 A, DIG. 6, 87.05; 403/108, 109, 321, 325, 326, 329, 330

[56] References Cited

U.S. PATENT DOCUMENTS

| | | | |
|---|---|---|---|
| 2,742,300 | 4/1956 | Carver | 403/329 X |
| 2,940,776 | 6/1960 | Curtis | 280/406 A |
| 4,049,288 | 9/1977 | Young | 280/406 A |

FOREIGN PATENT DOCUMENTS 1316681  5/1973  United Kingdom ................. 403/109

Primary Examiner—John A. Pekar
Attorney, Agent, or Firm—Olsen and Stephenson

[57] ABSTRACT

A weight distribution trailer hitch which has a pair of spring rods pivotally connected at their forward ends on vertical-axis pivot means adjacent the hitch ball and at their rear ends in a tension relation to the trailer tongue. Cooperating means on the spring rods and the pivot means prevent the axial displacement of the forward end portions of the spring rods from the pivot means and includes a retaining clip mounted on the pivot means. The retaining clip has a leg that is biased radially inwardly into the pivot means and into a groove formed in the spring rod. Insertion of the end portion into the pivot means forces the leg outwardly which then is urged into the groove when they are aligned.

10 Claims, 10 Drawing Figures

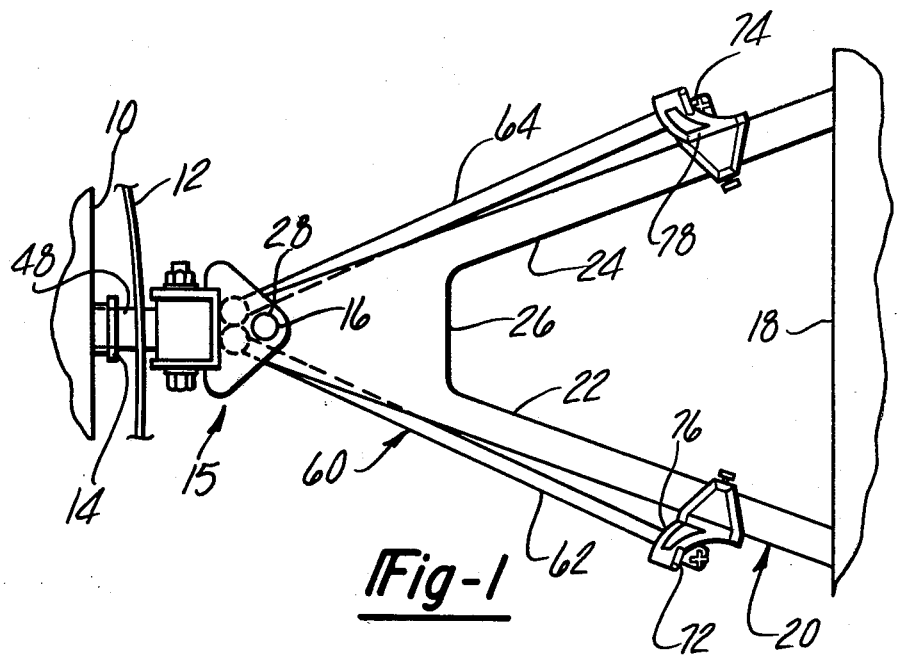
Fig-1
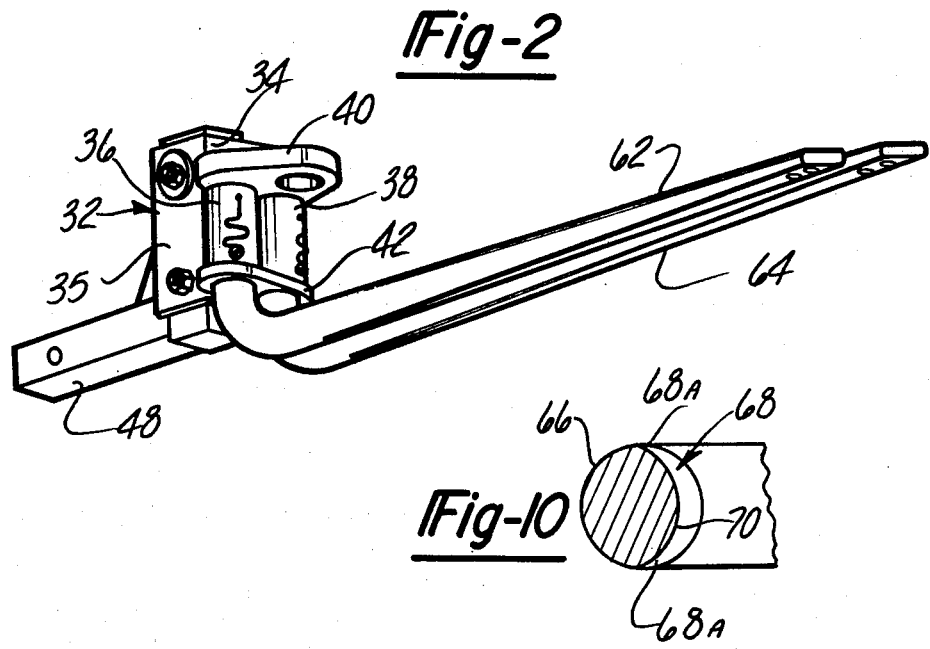
Fig-2
Fig-10

TRAILER HITCH

BACKGROUND OF THE INVENTION

The present invention relates to trailer hitch apparatus for towing trailers with an automobile. More particularly, this invention is an improvement of the hitch apparatus disclosed in U.S. Pat. No. 4,049,288, patented on Sept. 20, 1977, and assigned to the assignee of the present invention. This patent describes and illustrates interchangeable spring rods for equalizing the load on the wheels of the automobile which is an improvement over the trailer hitch disclosed in U.S. Pat. No. 2,817,541.

An important consideration in designing trailer hitches of this type is the ease with which the user can assemble and disassemble the spring rods and the trailer hitch. It is, therefore, the object of this invention to provide a trailer hitch having improved means for retaining the spring rods. Currently, most trailer hitches are fabricated by welding the tops and bottoms of the socket tubes to a channel-shaped mounting member. The outer surfaces of the tubes are not welded to the mounting member. It is a further object of this invention, therefore, to provide a trailer hitch having an improved construction.

SUMMARY OF THE INVENTION

In accordance with the present invention, an improved trailer hitch is provided having a retaining clip for retaining each spring rod in its associated pivot means.

According to one form of the present invention, a trailer hitch is provided comprising a pair of substantially vertical-axis pivot means in the form of pair of socket tubes which are mounted adjacent to the ball at laterally opposite sides thereof, a pair of normally straight spring rods having angular end portions rotatably mounted in the socket tubes for lateral pivotal movement of the rods, a pair of generally vertically disposed flexible suspension members having the corresponding ends thereof attached to free ends of the rods, and means adapted to be mounted on a trailer tongue above the rods and engaged by the flexible suspension members for bending the spring rods. The socket tubes and the angular end portions have cooperating means preventing axial displacement of the angular end portions. The cooperating means of the pivot means and its associated angular end portion include a circumferentially extending groove near the terminal end of the forward end portion and an opening in the associated pivot means located in substantial alignment with the groove of the end portion when it is positioned in the socket tube.

The cooperating means further includes a retaining clip having a leg extending radially inwardly through the socket tube and into the groove in the end portion. The retaining clip in one form has a mounting portion that partially surrounds and frictionally engages the socket tube to maintain the retaining clip on the socket tube. In another form, the retaining clip is secured to the socket tube by a conventional screw or other fastener. The retaining clip is formed of resilient spring material which serves to bias the leg radially inwardly into the socket tube. Accordingly, when the forward end portion of the spring rod is inserted upwardly into the socket tube, the end portion engages and displaces the leg of the retaining clip radially outwardly against the biasing action of the retaining clip. When the groove is aligned with the leg the retaining clip biases the leg into the groove where it cooperates with the groove to prevent the axial displacement of the end portion from the socket tube.

The forward end portions of the spring rods can be removed from their respective socket tubes by manually grasping the retaining clip and withdrawing the leg from the groove. Also, the groove in each end portion is formed so that it has an upright wall whose radial distance from the axis of the forward end portion increases progressively toward the ends of the groove which extends partially around the end portion. So, lateral pivotal movement of the spring rod causes the upright wall in the groove to engage and push the leg radially outwardly. When the end of the groove is in alignment with the leg, the leg will be urged against the peripheral surface of the end portion out of the groove thereby enabling the end portion to be withdrawn from the socket tube.

The improved trailer hitch of this invention is further characterized by its unique construction. The socket tubes have a generally circular outer surface and are positioned in abutting relationship with a mounting channel member and are welded to the channel member along the surfaces where they engage the channel member. In one embodiment, the socket tubes are also positioned side-by-side in an abutting relationship and are welded together.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 1 is a fragmentary plan view of a trailer hitch embodying the present invention, showing the hitch attached to a trailer tongue;

FIG. 2 is a fragmentary perspective view of the trailer hitch illustrated in FIG. 1;

FIG. 10 is a sectional top view of a forward portion of one spring rod taken substantially from line 10—10 in FIG. 5.

DESCRIPTION OF THE PREFERRED EMBODIMENTS

Figure 3:
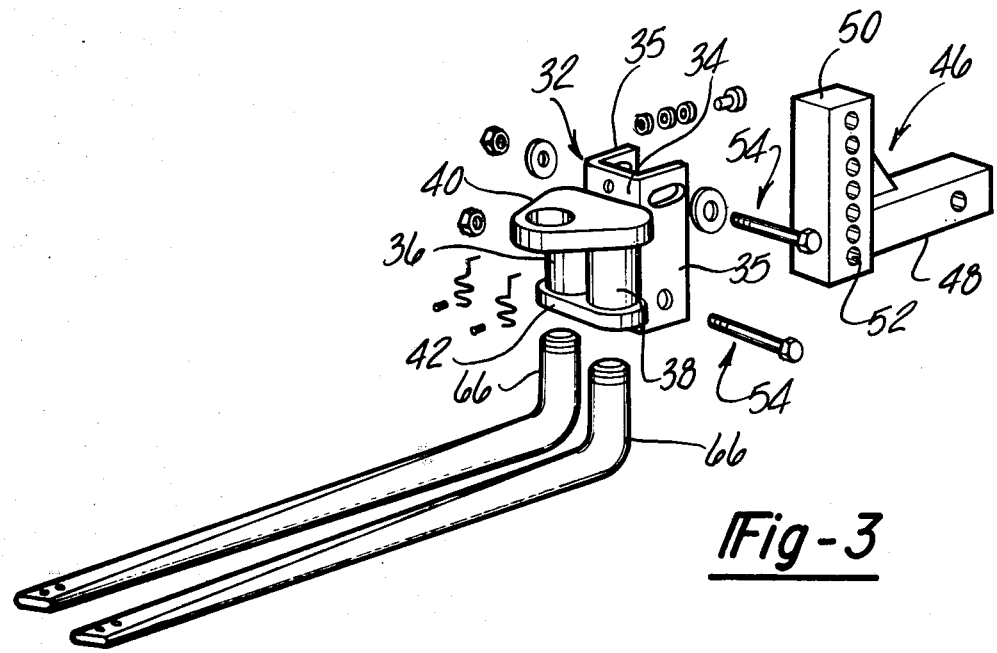
FIG. 3 is an exploded view of the trailer hitch of the present invention.

Before explaining the present invention in detail, it is to be understood that the invention is not limited in its application to the details of construction and arrangement of parts illustrated in the accompanying drawing, since the invention is capable of other embodiments or being practiced or carried out in various ways. Also, it is to be understood that the phraseology or terminology employed herein is for the purpose of description and not limitation.

Referring to the drawing, the invention will be described in greater detail. A portion of an automobile 10 is shown having a bumper 12. A trailer hitch is mounted on the automobile 10 and has a draw bar or receiver 14 supporting a ball mount unit 15 having a conventional ball 16. A trailer 18 having a tongue 20 is provided, the tongue 20 comprising a pair of channel bars 22 and 24 each secured at one end to the trailer 18 and converging forward toward and secured at the other end to a web 26. A socket 28 is provided at the forward end portion of the web 26 for engagement with the ball 16.

The ball mount unit 15, as seen in FIGS. 2 and 3, comprises a channel or support member 32 having a front mounting face or surface 34 from which parallel legs 35 extend forwardly. Socket tubes 36 and 38 having a generally circular outer surfaces are positioned in abutting relationship with the mounting face 34 and are welded thereto where they engage the mounting face 34. In the embodiment shown in FIGS. 1-3, the socket tubes 36 and 38 are positioned in abutting relationship with each other and are welded together. It is also contemplated that the socket tubes 36 and 38 can be laterally spaced apart and welded to the channel member 32. A ball mount plate 40 is welded to the mounting face 34 and to the upper ends of the socket tubes 36 and 38. A base plate 42 is welded to the mounting face 34 and to the bottoms of the socket tubes 38 and 36 and has openings located in alignment with the holes in the socket tubes 36 and 38. The channel member 32 is mounted on an L-shaped shank member 46 having an arm portion 48 that telescopes into the receiver 14 and being locked in place by a pin (not shown). The shank 46 also includes a mounting portion 50 having transversely extending holes 52. The mounting portion 50 receives the channel 32 which can be vertically adjusted thereon. Nut and bolt assemblies 54 extend through the openings 52 and through aligned openings in the channel legs 35 to secure the channel 32 on the shank 46.

Spring rods 60 are provided for equalizing the load on the wheels on the automobile 10. In the present invention, the rods 60 include left and right rods 62 and 64 having angular upturned forward end portions 66. Each end portion 66 has an upright axis and includes a circumferentially extending groove 68 which extends partially around the forward end portion 66 near its upper terminal end. The groove 68 is defined by an inner upright wall 70 whose radial distance from the axis of the end portion 66 increases progressively toward the ends 68A of the groove 68 until the upright wall 70 merges with the outer surface of the end portion 66. The function of the groove 70 will be explained in greater detail below.

In the conventional manner, the free or rear ends of the spring rods 62 and 64 are mounted on the channel bars 22 and 24 of the tongue 20 by clip means 72 and 74. The details of the clip means 72 and 74 form no part of the present invention and reference is made to prior U.S. Pat. No. 2,817,541 for a more complete description of these components. It is to be understood that in the normal mounted positions, the rearward ends of the spring rods 62 and 64 are bent upwardly in a state of tension by chains 76 and 78 and the associated clips 72 and 74.

Figure 4:
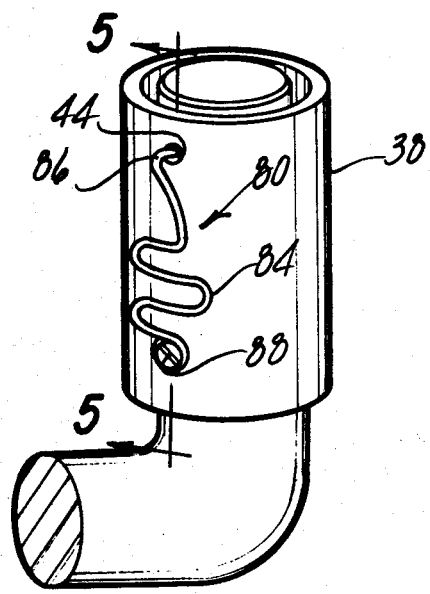
FIG. 4 is an enlarged fragmentary view of a portion of the trailer hitch of the present invention showing one pivotal mounting.
Figure 5:
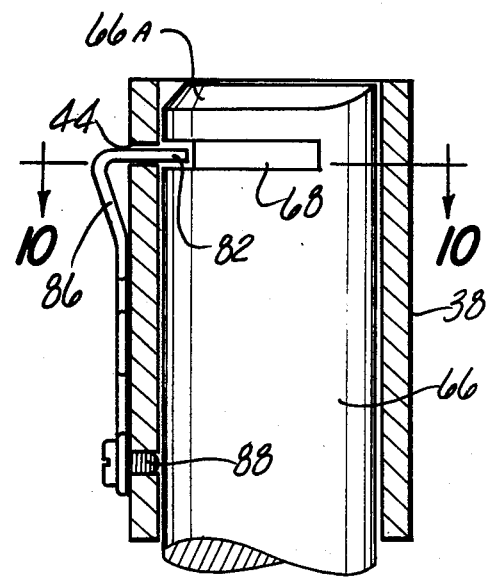
FIG. 5 is a sectional view of the pivotal mounting taken substantially from line 5—5 in FIG. 4.

As seen in FIGS. 2 and 4 and 5, a retaining clip 80 having a leg 82 is mounted on the socket tube 38 and cooperates with the groove 68 in the end portion 66 to prevent its axial displacement from the socket tube 38. As shown in the drawing, an identical retaining clip 80 is mounted on the socket tube 36. The retaining clip 80 has a sinuous main body portion 84 and a raised portion 86 connecting the leg 82 with the main body portion 84. A conventional screw 88 or other fastener which is mounted in the socket tube 38 secures the retaining clip 80 to the socket tube 38. The retaining clip 80 is formed of a resilient spring wire and biases the leg 82 radially inwardly through the opening 44 in the socket tube 38 and into the groove 68. As shown in FIG. 5, the upper or terminal end of the end portion 66 is chamfered at 66A to facilitate the insertion of the end portion 66 into the socket tube 38. Upward movement of the end portion 66 into the socket tube 38 causes the chamfered end 66A to engage and displace the leg 82 radially outwardly from the socket tube 38. Further upward movement of the end portion 66 aligns the groove 68 with the leg 82 which then is moved into the groove 68 by the biasing action of the retaining clip 80 and cooperates therewith to prevent the axial displacement of the end portion 66 from the socket tube 38. The raised portion 86 enables the manual withdrawal of the leg 82 from the groove 68 to release the end portion 66 for withdrawl from the socket tube 38.

The spring rods 60 can also be withdrawn from the socket tube 38 in the following manner. The upright wall 70 of the groove 68 merges with the outer surface of the end portion 66 at the ends 68A of the groove 68 as the radial distance of the upright wall 70 increases toward the ends 68A. Accordingly, lateral pivotal movement of the spring rod 60 moves the upright wall 70 into engagement with the leg 82. Continued lateral pivotal movement of the spring rod 60 displaces the leg 82 outwardly until it rides the outer surface of the end portion 66. The end portion 66 can thus be withdrawn from the socket tube 38 without any manual grasping of the retention clip 80.

Figure 6:
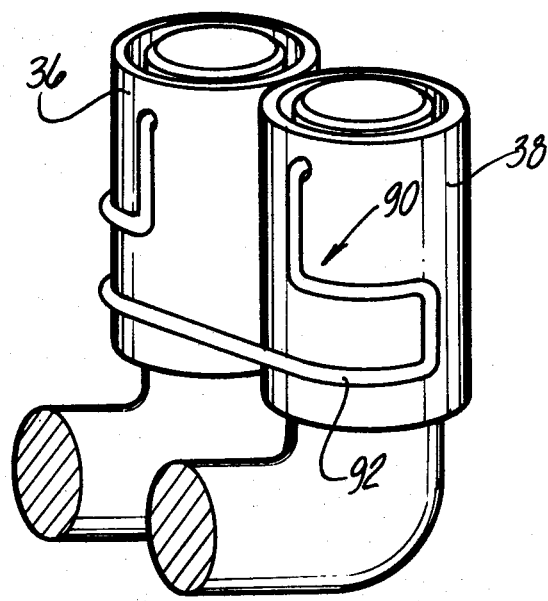
FIG. 6 is a perspective view of a portion of the trailer hitch of the present invention illustrating a modified retention clip.
Figure 7:
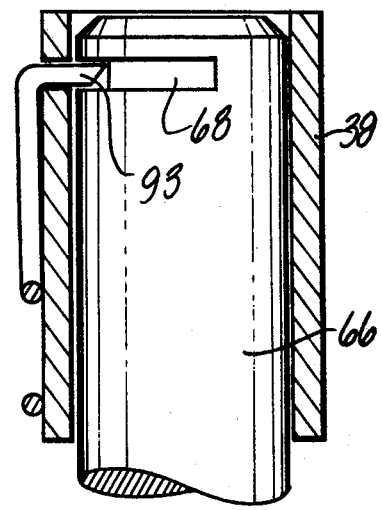
FIG. 7 is a sectional view of the pivotal mounting taken substantially from line 7—7 in FIG. 6.

With reference to FIGS. 6 and 7, a modified retaining clip 90 is shown. The retaining clip 90 includes a mounting portion 92 which partially surrounds and frictionally engages the side-by-side socket tubes 36 and 38 on their laterally opposite sides. The mounting portion 92 consists of connected U-shaped portions which are bent at their opposite ends to conform generally to the outer surfaces of the socket tubes 36 and 38. The inherent resiliency of the spring material enables the mounting portion 92 to frictionally maintain the clip 90 on the socket tubes 36 and 38. Each of the legs 93 of the retaining clip 90, functions in the same manner as the leg 82 of the retaining clip 80. In this instance, however, the end of each leg 93 is beveled to cooperate with the tapered end 66A of the end portion 66 to facilitate the outward displacement of the leg 93 when the end portion 66 is inserted into the socket tube 38. The retaining clip 90, therefore, is a unitary structure having a pair of legs 93 to lock the spring rods 60 in their respective pivot means.

Figure 8:
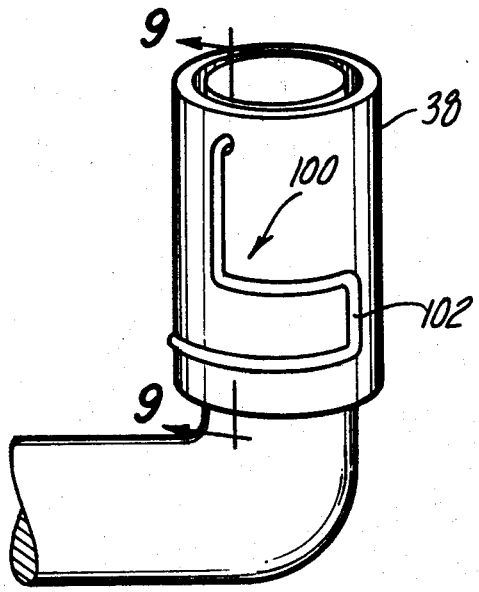
FIG. 8 is a perspective fragmentary view of the trailer hitch of the present invention showing another modified form of the retention clip.
Figure 9:
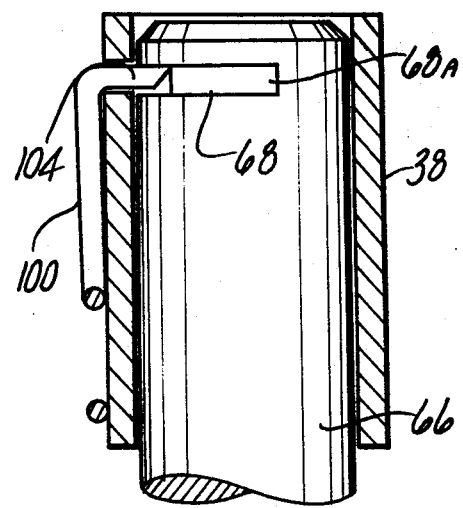
FIG. 9 is a sectional view of the pivotal mounting taken substantially from line 9—9 in FIG. 8.

FIGS. 8 and 9 show another modified retaining clip 100 wherein the retaining clip 100 has a U-shaped mounting portion 102 which partially surrounds and frictionally engages only one socket tube 36 or 38. Thus, for the side-by-side socket tubes 36 and 38 two retaining clips 100 are required. The retaining clip 100 has the mounting portion 102 formed of spring wire that surrounds and frictionally engages a portion of the outer surface of the socket tube to maintain the retention clip thereon. Each retaining clip 100 has a leg 104 which functions like the legs of the clips 80 and 90.

From the above description it can be seen that an improved trailer hitch is disclosed having retaining clips which facilitate the assembly and disassembly of the spring rods 62 and 64 and the pivotal mounting means 36 and 38. Simply inserting the end portions 66 of the spring bars 62 and 64 in the pivot means automatically positions the legs of the retaining clip in the grooves 68 to prevent axial displacement of the end portions 66. The welding of the socket tubes 36 and 38 to each other and to the mounting face 34 of the channel member 32 reduces the manufacturing effort and thereby reducing costs while providing a trailer hitch conforming to industry standards.

It is claimed:

1. A trailer hitch having a ball for use with a socket of a trailer tongue to provide an articulated joint between an automobile on which the hitch is mounted and a trailer on which the trailer tongue is mounted, comprising a pair of substantially vertical-axis pivot means mounted adjacent to said ball at laterally opposite sides thereof, said hitch including a support member having a generally upright mounting face, each of said pivot means comprising a socket tube affixed along its length to said mounting face in a side-by-side relationship with the other socket tube, a pair of normally straight spring rods each having an angular end portion rotatably mounted in an associated one of said socket tubes for lateral pivotal movement of said rods, each of said end portions having a tapered terminal end, a pair of generally vertically disposed flexible suspension members having the corresponding ends thereof attached to the free ends of said rods, and means for mounting on the trailer tongue above said rods engaged by said flexible suspension members for bending said spring rods, said pivot means and said angular end portions having cooperating means preventing axial displacement of said angular end portions, the cooperating means of each pivot means and its associated angular end portion including a circumferentially extending groove near the terminal end of said end portion, an opening in the associated socket tube, a retaining clip having a leg extending through said opening and radially into said groove for preventing axial displacement of the angular end portion relative to its associated socket tube, said clip biasing said leg toward said end portion, said leg being displaced radially outwardly during insertion of said end portion into said socket tube as said leg is engaged by the tapered terminal end of said end portion, said clip biasing said leg into said groove when said end portion is moved to a position in which said leg and said groove are in substantial alignment.

2. The trailer hitch that is defined in claim 1, wherein said retaining clip includes a resilient mounting portion surrounding and frictionally engaging at least a portion of said pivot means to maintain said clip on said pivot means.

3. The trailer hitch that is defined in claim 2, wherein said mounting portion comprises generally U-shaped spring wire member.

4. The trailer hitch that is defined in claim 1, wherein said retaining clip includes a main body portion supporting said leg, and a projecting portion displaced from said pivot means when said leg is positioned in said groove to allow the manual withdrawal of said leg from said groove.

5. The trailer hitch that is defined in claim 1, wherein said retaining clip comprises a unitary structure mounted on said pair of pivot means, said retaining clip having a pair of said legs each being positioned in said groove of an associated end portion to prevent its axial displacement therefrom, and a resilient mounting portion frictionally engaged with said pair of pivot means to maintain said retaining clip on said pair of pivot means.

6. The trailer hitch that is defined in claim 1, wherein said leg has a beveled terminal end engageable with the tapered terminal end of said end portion when said end portion is inserted into said pivot means to facilitate the radially outward movement of said leg.

7. The trailer hitch that is defined in claim 1, wherein said socket tubes are positioned in abutting relationship with each other, said socket tubes being welded together aong with abutting surfaces.

8. The trailer hitch according to claim 1, wherein said retaining clip includes a first spring portion connected to said leg and a second spring portion connected to and extending transversely with respect to said first spring portion, said first spring portion primarily bending and said second spring portion primarily twisting in response to radially outward movement of said leg.

9. The trailer hitch that is defined in claim 8, wherein said second spring portion is formed of a spring wire member having a generally sinuous shape forming a plurality of interconnected and transversely extending spring portions cooperating to lessen the biasing force on said leg.

10. A trailer hitch having a ball for use with a socket of a trailer tongue to provide an articulated joint between an automobile on which the hitch is mounted and a trailer on which the trailer tongue is mounted comprising a pair of substantially vertical-axis pivot means mounted adjacent to said ball at laterally opposite sides thereof, a pair of normally straight spring rods having angular end portions rotatably mounted in said pivot means for lateral pivotal movement of said rods, each of said angular end portions having an upright axis, a pair of generally vertically disposed flexible suspension members having the corresponding ends thereof attached to the free ends of said rods, and means for mounting on the trailer tongue above said rods engaged by said flexible suspension members for bending said spring rods, said pivot means and said angular end portions having cooperating means preventing axial displacement of said angular end portions, the cooperating means of each pivot means and its associated angular end portion including a circumferentially extending groove near the terminal end of said end portion extending partially about the periphery of said end portion, an opening in the associated means, a retaining clip having a leg extending through said opening and radially into said groove for preventing axial displacement of the angular end portion relative to its associated pivot means, said clip biasing said leg toward said end portion, said leg being displaced radially outwardly during insertion of said end portion into said associated pivot means, said clip biasing said leg into said groove when said end portion is moved to a position in which said leg and said groove are in substantial alignment, said groove having an upright wall whose radial distance from said upright axis of said end portion increases toward the ends of said groove, whereby lateral movement of said spring in said associated pivot means engages said upright wall with said leg to move said leg radially outwardly from said groove to permit said end portion to be moved axially from said pivot means.

* * * * *